United States Patent [19]

Morris

[11] Patent Number: 5,742,654
[45] Date of Patent: Apr. 21, 1998

[54] METHOD AND APPARATUS FOR ENHANCING REMOVAL OF CORROSION PRODUCTS FROM A NUCLEAR REACTOR PIPING SYSTEM

[75] Inventor: Ronald Morris, North Huntingdon, Pa.

[73] Assignee: Westinghouse Electric Corporation, Pittsburgh, Pa.

[21] Appl. No.: 599,912

[22] Filed: Feb. 12, 1996

[51] Int. Cl.⁶ .................................................. G21C 19/30
[52] U.S. Cl. ......................... 376/306; 376/313; 376/316
[58] Field of Search .................................... 376/306, 310, 376/313, 316

[56] References Cited

U.S. PATENT DOCUMENTS

5,089,216  2/1992  Schlonski et al. ............... 376/310
5,377,244  12/1994  Stenger ........................... 376/313

Primary Examiner—Daniel D. Wasil

[57] ABSTRACT

Method and apparatus for enhancing removal of corrosion products from a nuclear reactor piping system. A reagent is supplied into a multi-part reactor piping system to react with the corrosion products therein. The corrosion products dissolve into the reagent to define a contaminated solution. The contaminated solution is brought into contact with an ion exchange resin bed that absorbs the corrosion products from the contaminated solution to define a reagent-containing contaminant-free solution. In this regard, a circulation pump having a predetermined net positive suction head (NPSH) interconnects the system with the resin bed for pumping the contaminated solution from one part of the reactor piping system and into contact with the resin bed and thereafter pumping the contaminant-free solution from the resin bed and to another part of the reactor piping system to remove the corrosion products. Moreover, a gas injector injects a pressurized gas into the reactor system to pressurize the reactor system to a predetermined pressure necessary to maintain the NPSH during transfer of the contaminant-free solution from one part of the piping system to another part of the piping system. During each transfer, the pump brings substantially all contaminated solution into contact with the resin bed as it removes substantially all the corrosion products from the piping system.

22 Claims, 4 Drawing Sheets

METHOD AND APPARATUS FOR ENHANCING REMOVAL OF CORROSION PRODUCTS FROM A NUCLEAR REACTOR PIPING SYSTEM

BACKGROUND OF THE INVENTION

This invention generally relates to decontamination methods and apparatus and more particularly relates to a method and an apparatus for enhancing removal of corrosion products from a nuclear reactor piping system, which nuclear reactor piping system may be of a type commonly found in a BWR (Boiling Water Reactor).

A BWR comprises a reactor vessel partially filled with water coolant which serves as a heat transfer medium. A reactor core containing nuclear fuel that generates heat is surrounded by the water coolant. A plurality of "jet" pumps are disposed within the vessel for increasing the velocity of the coolant through the reactor core in order to efficiently remove the heat generated by the nuclear fuel in the reactor core. The heat generated by the nuclear fuel is taken-up by the surrounding water, which is vaporized by the heat to produce steam. A main steam line conducts the steam from the vessel to a turbine-generator to produce electricity in a manner well known in the art. After the steam passes through the turbine-generator, it is piped to a condenser for condensing the steam into liquid water. The condensed water is returned to the reactor vessel by means of a coolant feed pipe for replenishing the water vaporized by the heat of the nuclear fuel.

Disposed inwardly of the reactor vessel is a core barrel surrounding the core, the core barrel and the vessel wall defining an annulus therebetween. The condensed coolant, which flows through the feed pipe, is fed into the annulus and from there eventually into a coolant recirculation piping system which supplies the coolant to the jet pumps. As previously mentioned, the jet pumps in turn pump the coolant through the reactor core.

However, it has been observed that as the reactor operates, the wetted surfaces of the coolant feedwater and recirculation piping systems corrode to form surface oxides of iron, manganese, chromium, zinc, cobalt, and other metals. These corrosion products are transported by the coolant flowing through the coolant piping system to the reactor core where the corrosion products become radioactive. Of course, the corrosion products transported to the reactor core are retransported back into the feedwater and recirculation piping systems by the flowing coolant. These radioactive corrosion products deposit along the interior wetted surfaces of the piping systems and generate radiation fields surrounding the piping systems. Such radiation fields surrounding the coolant piping systems are higher than they would otherwise be without the presence of the radioactive corrosion products.

The presence of such radiation fields surrounding the piping systems is undesirable particularly when the reactor is periodically shut-down for maintenance and servicing. Such maintenance and servicing operations may be to recharge the reactor core with fresh nuclear fuel or to repair or replace reactor system components (e.g., piping, pumps, valves, tanks, e.t.c.). The servicing of the reactor is performed by plant station and contractor personnel working in the vicinity of the reactor vessel. Therefore, it is important to maintain radiation exposure to plant station and contractor personnel to a level as low as reasonable achievable because elevated radiation exposure to service personnel may increase the health hazard to such personnel. To avoid such a potential health hazard to service personnel, the amount of time a worker may work in the vicinity of the vessel is restricted to reduce the accumulated radiation exposure to that worker. However, restricting the time each individual may work in the vicinity of the vessel in turn increases costs to maintain and service the reactor because greater numbers of service personnel must be hired and trained to maintain and service the reactor. Therefore, it is desirable to provide a method of reducing the radiation fields surrounding the coolant piping system so that each worker may work in the vicinity of the reactor for longer periods of time without substantially increasing his radiation exposure.

One prior art technique for reducing the radiation fields surrounding the piping system is to remove the corrosion products by injecting a chemical reagent into the piping system to dissolve the corrosion products which are then removed from the piping system. For example, in the proprietary Can-Decon and CanDerem processes, available from Atomic Energie du Canada, Limited located in Chalk River, Canada, coolant water containing organic acids is circulated through the piping system to dissolve the corrosion products. As another example, in the proprietary LOMI (Low Oxidation-state Metal Ion) process, available from the Electric Power Research Institute, incorporated located in Palo Alto, Calif., coolant water containing vanadous formate, sodium hydroxide and picolinic acid is circulated through the coolant piping system to dissolve the corrosion products.

As the corrosion products are dissolved using one or the other of the previously mentioned processes, a circulation pump transports the dissolved corrosion products and reagent from the piping system and through an ion exchange resin bed where the dissolved corrosion products and reagent are deposited. The circulation pump is typically located approximately 15 feet above the elevation of the lowest point of the piping system. However, applicant has observed that in the typical reactor piping system, the ability of the circulation suction pump to completely transfer the corrosion-laden reagent from the piping system is hampered by the need to maintain sufficient Net Positive Suction Head (i.e., NPSH) in the piping system that is equal to or greater than the NPSH of the suction pump. If the NPSH of the piping system drops below the rated NPSH of the suction pump, then the suction pump will loose its ability to supply sufficient suction. Therefore, the amount of corrosion-laden reagent that is removed from the piping system may be limited by the rated NPSH of the suction pump. Consequently, a problem in the art is to sufficiently remove the corrosion-laden reagent from the piping system in view of the rated NPSH of existing circulation suction pumps.

In addition, use of the previously mentioned prior art technique necessitates off-loading the reactor core from the reactor vessel before the decontamination process is begun because it is desirable to lower the water level in the vessel prior to decontamination. This delay occasioned by off-loading the reactor core places the decontamination of the piping system on critical path during service operations and also increases those costs associated with the time taken to off-load and later reload the reactor core. Therefore, another problem in the art is to provide a method for decontaminating the piping system without the need to off-load the reactor core before the decontamination process is begun.

Another prior art process for decontaminating a nuclear reactor coolant system is disclosed in U.S. Pat. No. 5,305,360 titled "Process For Decontaminating A Nuclear Reactor Coolant System" issued Apr. 19, 1994 in the name of John F. Remark, et al. This patent discloses a process for oxidizing metal oxides on surfaces wetted by aqueous solutions. However, the process disclosed by the Remark, et al. patent does not appear to address the problems of removing the corrosion product-laden reagent from the piping system in a manner such that the head pressure in the piping system does not fall below the NPSH requirements of the circulation pump and also does not appear to disclose a process that avoids the need to off-load the reactor core before the decontamination process is begun.

Therefore, a method and an apparatus are needed for suitably enhancing removal of corrosion products from a nuclear reactor piping system in a manner that solves the previously mentioned prior art problems.

SUMMARY OF THE INVENTION

Disclosed herein are a method and an apparatus for enhancing removal of corrosion products from a nuclear reactor piping system. A reagent is supplied into a multi-part reactor piping system to react with the corrosion products therein. The corrosion products dissolve into the reagent to define a contaminated solution. The contaminated solution is brought into contact with an ion exchange resin bed that absorbs the contaminated corrosion products from the contaminated solution to define a reagent-containing contaminant-free solution. More specifically, a circulation pump having a rated or predetermined net positive suction head (NPSH) interconnects the reactor system with the resin bed for pumping the contaminated solution from one part of the reactor piping system and into contact with the resin bed and thereafter pumping the contaminant-free solution from the resin bed and to another part of the reactor piping system to remove the corrosion products. Moreover, a gas injector injects a pressurized gas into the system to pressurize the reactor piping system to a predetermined pressure necessary to maintain the NPSH during transfer of the contaminant-free solution from one part of the reactor piping system to another part of the reactor piping system. During each transfer, the pump brings substantially all the contaminated solution into contact with the resin bed as it removes substantially all the corrosion products from the piping system.

The invention in its broad form is, in association with a nuclear reactor piping system having an interior wall having a corrosion product thereon; a method of removing the corrosion product from the system, comprising the steps of dissolving the corrosion product from the wall by supplying a chemical agent into the systems the corrosion product dissolving into the chemical agent to define a contaminated solution in the system; absorbing the dissolved corrosion product from the contaminated solution to define a contaminant-free solution by contacting the contaminated solution with an ion exchange resin; removing the contaminated solution from the system and into contact with the resin bed and thereafter pumping the contaminant-free solution from the resin bed and to the system by operating a circulation pump interconnecting the system and the resin bed, the circulation pump having a predetermined net positive suction head; and pressurizing the system to a predetermined pressure necessary to transfer the contaminated solution from one part of the system to another part of the system.

The invention in its broad form is also, in association with a nuclear reactor piping system having an interior wall having a corrosion product thereon, an apparatus for removing the corrosion product from the system, comprising reagent supply means connected to the system for supplying a reagent into the reactor system to dissolve the corrosion product from the wall and into the reagent so as to define a contaminated solution; absorption means in contact with the contaminated solution for absorbing the dissolved corrosion product from the contaminated solution so as to define a reagent-containing contaminant-free solution; circulation pump means interconnecting the system and said absorption means for removing the contaminated solution from the system and into contact with said absorption means and thereafter pumping the contaminant-free solution from said absorption means and to the system, said circulation pump means having a predetermined net positive suction head; and pressurizing means connected to the system for pressurizing the system to a predetermined pressure necessary to transfer the contaminated solution from one part of the system to another part of the system.

An object of the present invention is to provide a method and apparatus for removing a corrosion product from a nuclear reactor piping system in a manner such that the NPSH in the piping system does not fall below the rated NPSH of the circulation pump used to remove the corrosion-laden reagent from the piping system.

Another object of the present invention is to provide a method and apparatus for removing a corrosion product from a nuclear reactor piping system without the need to off-load the reactor core before the decontamination process is begun.

A feature of the present invention is the provision of pressurizing means connected to the piping system for pressurizing the system to a predetermined pressure in order to maintain a predetermined head pressure in the system as the circulation pump transfers a reagent from one part of the multi-part piping system to another part of the piping system.

An advantage of the present invention is that use thereof reduces radiation fields surrounding the piping system so that radiation exposure to service personnel is reduced thereby resulting in a reduced health hazard.

Another advantage of the present invention is that use thereof results in lowered costs to service the reactor.

Yet another advantage of the present invention is that use thereof removes more of the corrosion-laden reagent from the system compared to prior art techniques where system pressurization is not utilized.

Still another advantage of the present invention is that use thereof does away with the delay associated with off-loading the reactor core before the decontamination process is begun, so that decontamination activities are not on critical path during service operations.

A further advantage of the invention is that the volume of reagent requiring disposal is reduced by more efficient use of the reagent's capacity for oxide dissolution.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the invention, it is believed the invention will be better understood from the following description when taken in conjunction with the accompanying drawings wherein:

DESCRIPTION OF THE PREFERRED EMBODIMENT

Figure 1:
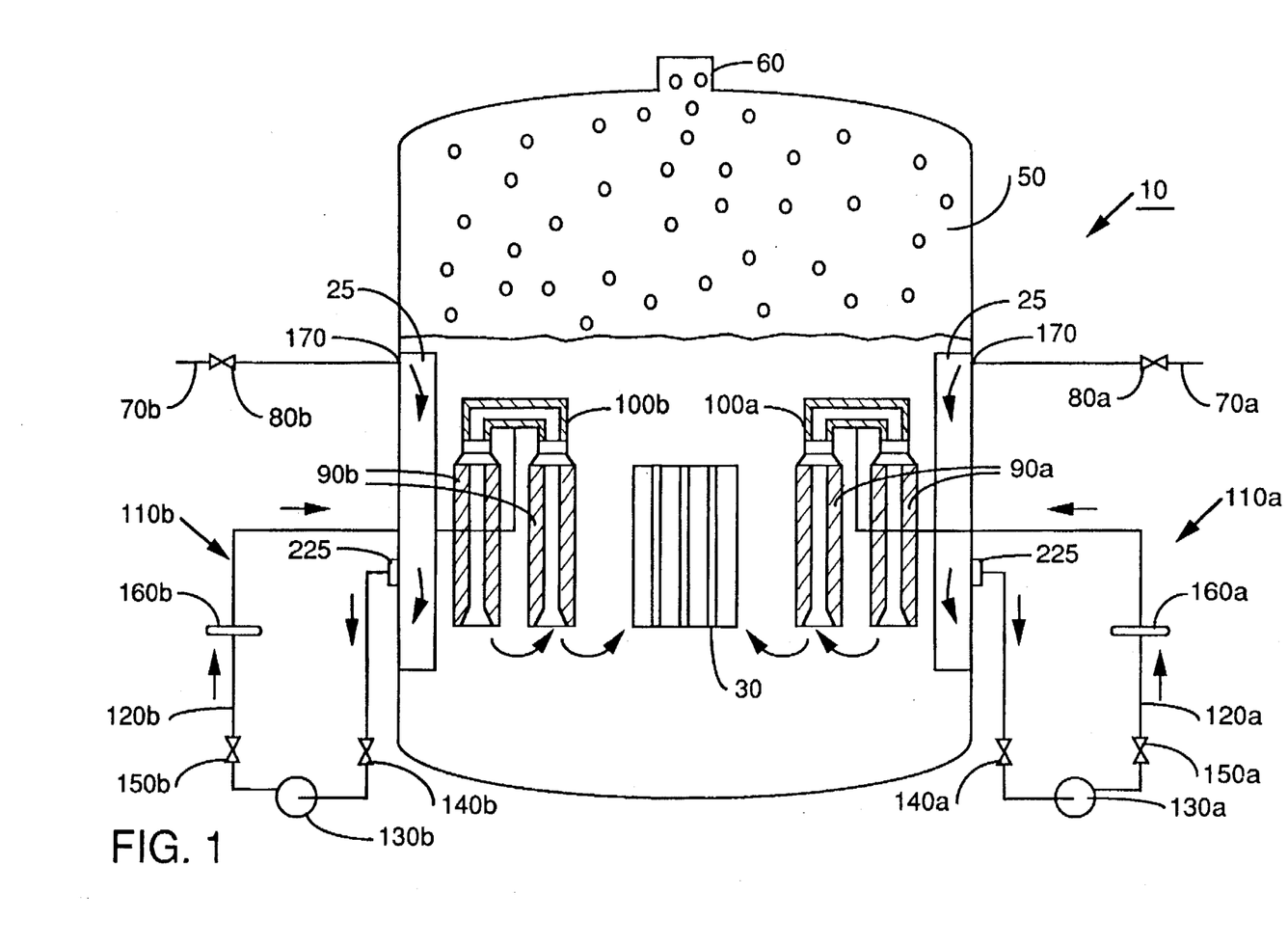
FIG. 1 shows a schematic of a BWR (Boiling Water Reactor) vessel, with parts removed for clarity, the reactor vessel having coolant therein and a coolant recirculation piping system attached thereto.

Referring to FIG. 1, there is shown a typical nuclear reactor (e.g., a BWR), generally referred to as 10, for producing steam. Reactor 10 includes a reactor vessel 20 in which is disposed a nuclear reactor core 30 containing fissionable nuclear material for generating heat. Interposed between the interior wall of vessel 20 and core 30 is a circular core barrel 32 defining an annulus 35 between the vessel interior wall and barrel 32. Surrounding reactor core 30 is a body of liquid coolant 40 (i.e., water) for absorbing the heat generated by reactor core 30. As the heat is absorbed by coolant 40, the coolant 40 will vaporize into steam 50 which travels out a main steam line 60 on its way to a turbine-generator (not shown) for producing electricity in a manner well known in the art of power generation. After passing through the turbine-generator, the steam travels through a pipe (not shown) to a condenser (not shown) which condenses or returns the steam to liquid water. The condensed liquid water then travels through coolant feed pipes 70a/70b, which may have open valves 80a/80b respectively therein, on its way to annulus 35.

Referring again to FIG. 1, disposed in vessel 20 are a plurality of "jet" pumps 90a/90b (only two pairs of which are shown) for circulating coolant 40 through reactor core 30, so that coolant 40 traverses reactor core 30 with a velocity sufficient to remove the heat generated by reactor core 30. Each pair of the jet pumps 90a and 90b are interconnected by crossover riser piping 100a/100b, respectively, to efficiently produce the jet pump effect (i.e., suctioning of coolant into and then jetting of coolant from the jet pumps). A plurality of recirculation piping systems, generally referred to as 110a/110b (only two of which are shown), are attached to vessel 20 and are in fluid communication with jet pumps 90a/90b for recirculating the liquid coolant through jet pumps 90a/90b and then through reactor core 30.

Still referring to FIG. 1, piping systems 110a and 110b include pipes 120a and 120b, respectively. Each pipe 120a and 120b has one end thereof attached to corresponding riser piping 100a/100b, respectively. The other end of each pipe 120a/120b is in fluid communication with annulus 35. Connected to pipes 120a/120b are associated recirculation pumps 130a/130b, respectively, for pumping coolant through pipes 120a/120b during normal operation. Also connected to pipes 120a/120b are pipe valves 140a/140b and 150a/150b. Valves 140a/140b are located on the suction side of pumps 130a/130b, respectively. Other valves 150a/150b are located on the discharge side of pumps 130a/130b, respectively. Valves 140a/140b and 150a/150b are normally open when reactor 10 is operating to allow free flow of coolant through pipes 120a/120b generally in the direction of the arrows shown in FIG. 1. In addition, disposed in pipes 120a/120b may be a hollow torus-shaped "ring" header 160a/160b to allow access to riser piping 100a/100b and jet pumps. Moreover, attached to vessel 20, as at location 170, are the previously mentioned coolant feed pipes 70a/70b for returning the condensed coolant to annulus 35 and thence to reactor vessel 20, so that the coolant vaporized by reactor core 30 is replenished. Valves 80a/80b, which are respectively connected to feed pipes 70a/70b, are normally open to allow for free flow of the condensed coolant into vessel annulus 35 during normal operation of reactor 10.

Figure 2:
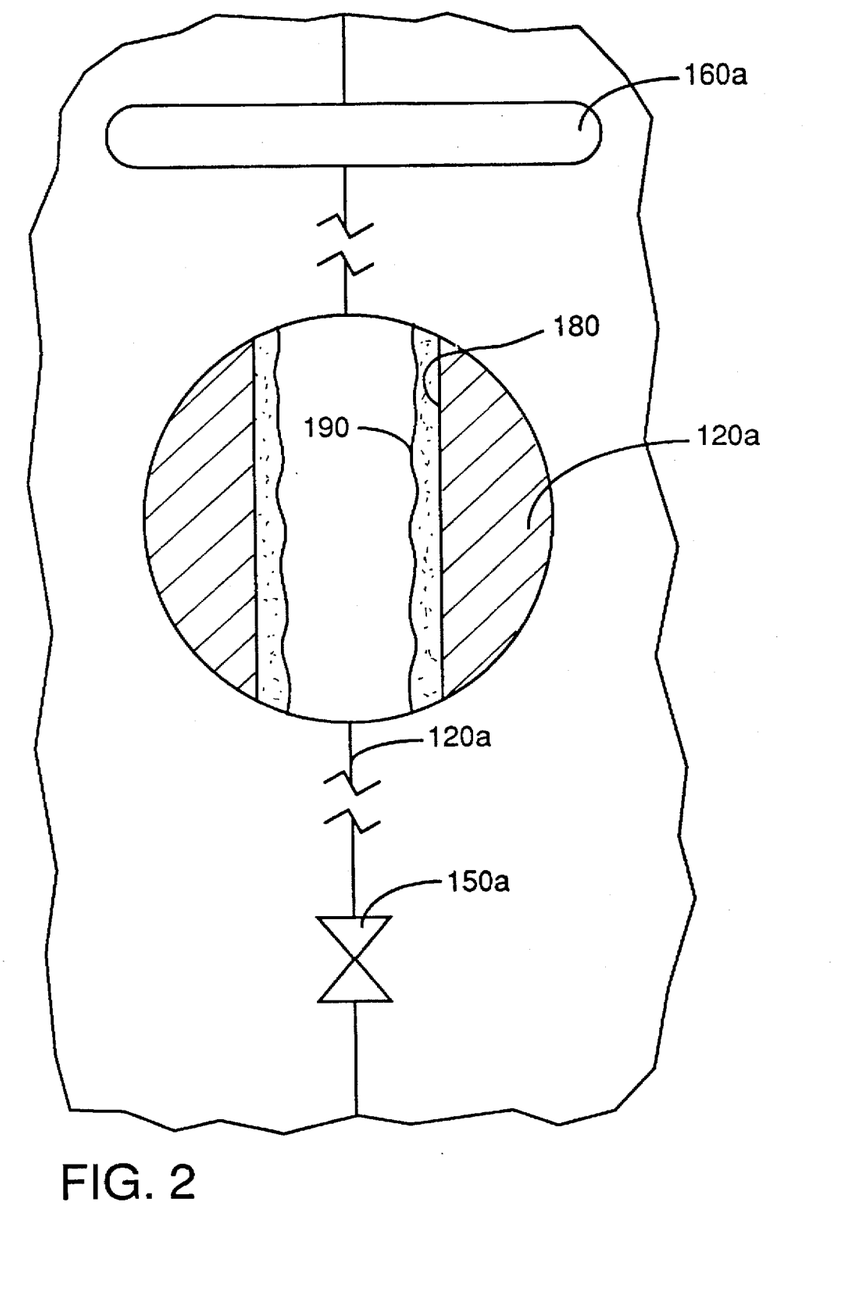
FIG. 2 is a magnified view in vertical section of a portion of the recirculation piping system showing a corrosion product build-up layered on an interior wall of the piping system.

As best seen in FIG. 2, pipes 120a/120b each has an interior wall 180 on which is deposited a layer of corrosion product 190. The corrosion product 190 may be radioactive oxides of iron, manganese, chromium, zinc, cobalt, and/or other metals casting a radiation field surrounding pipes 120a/120b It is desirable to remove radioactive corrosion product 190 from wall 180 prior to servicing reactor 10 in order to reduce radiation exposure to service personnel.

Figure 3:
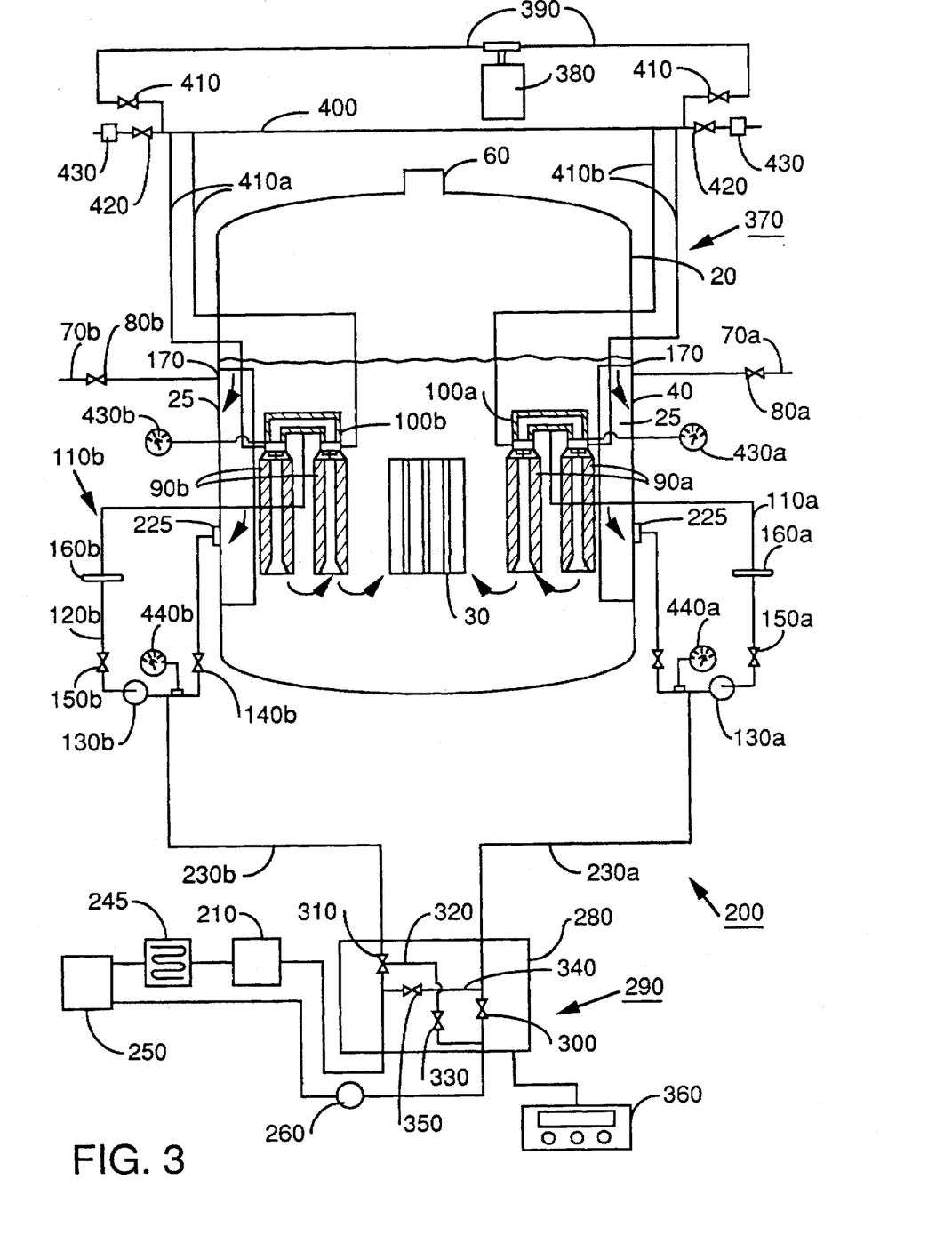
FIG. 3 shows a schematic of the apparatus of the invention connected to the recirculation piping system for removing the corrosion products therefrom.
Figure 4:
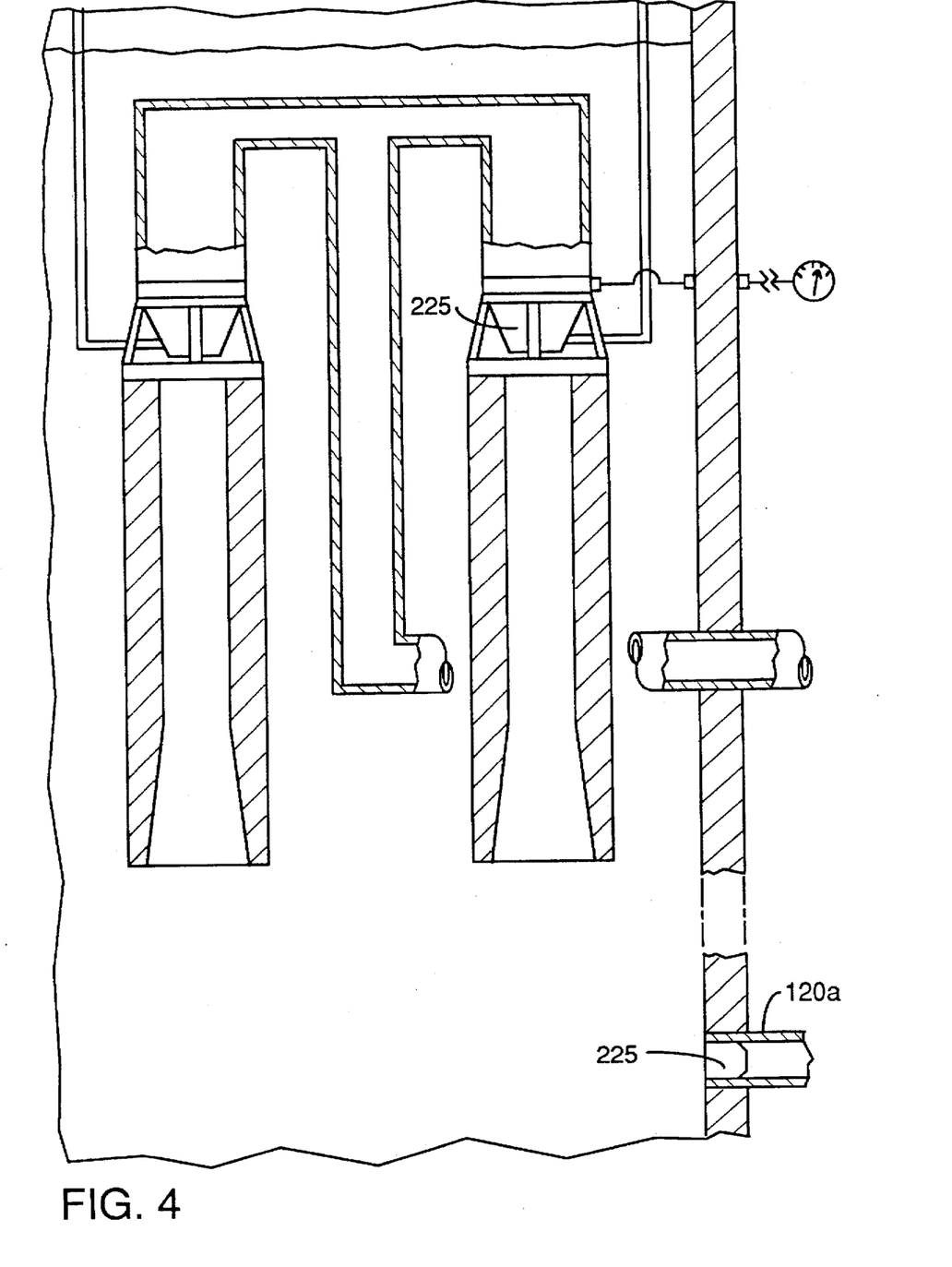
FIG. 4 is a view in vertical section of a pair of sealed "jet" pumps disposed interiorly of the reactor vessel.

Therefore, referring to FIGS. 3 and 4, there is shown the subject matter of the present invention, which is an apparatus, generally referred to as 200, for removing radioactive corrosion products 190 from piping systems 110a and 110b in order to reduce the radiation field surrounding piping systems 110a and 110b. Apparatus 200 comprises reagent supply means, such as a reagent supply source 210, connected to systems 110a/110b by a pair of conduits 230a and 230b for supplying equal amounts of liquid reagent into systems 110a/110b in order to dissolve corrosion product 190 from wall 180. Any suitable reagent is acceptable for dissolving corrosion product 190, such as the proprietary solutions "CAN DEREM" or "LOMI". As corrosion product 190 dissolves into the reagent, it will mix therewith to define a contaminated solution. However, it is understood that before the reagent is supplied to systems 110a/110b, reactor 10 is taken off-line. Moreover, to prevent the reagent from entering vessel 20, suitable plugs 225 are disposed in pipes 120a/120b and also in riser pipes 100a/100b to isolate systems 110a/110b from the body of liquid 40 in vessel 20. Plugs suitable for this purpose are available from Preferred Engineering, Incorporated located in Danbury, Conn.

As best seen in FIG. 3, the pair of conduits 230a and 230b are removably connected to pipes 120a and 120b, respectively, for reasons disclosed more fully hereinbelow. Moreover, each of the conduits 230a/230b that extends from its respective pipe 120a/120b is connectable to heater means, such as a heater 240. Heater 240 is adapted to heat the reagent in conduits 230a/230b to a predetermined temperature to enhance the decontamination effectiveness of the reagent. To achieve this purpose, heater 240 preferably has a heater element 245 therein capable of radiantly heating the reagent solution to a predetermined temperature of between approximately 190 and 240 degrees Fahrenheit so that the decontamination solution is delivered to systems 110a/110b at the desired temperature for decontamination. Conduits 230a/230b, after extending through circulation pump 260, terminate at absorption means, which absorption means comprises an ion exchange resin bed 250. The resin bed 250 may be composed of a cation resin, anion resin, activated carbon, and/or a mixed resin. Resin bed 250 absorbs or recovers the corrosion product 190 from the contaminated solution in order to define a contaminant-free solution. In addition, disposed downstream from heater 240 and resin bed 250 is the previously mentioned reagent supply source 210 for supplying the liquid reagent to the reactor piping system 110a/110b.

Referring again to FIG. 3, circulation pump 260 has a predetermined net positive suction head (NPSH), which may be approximately ten feet for reasons disclosed presently. In this regard, pump 260 must necessarily possess sufficient net positive suction head to draw-down the contaminated solution and reagent from the higher elevations of piping systems 110a/110b. However, in the typical reactor system, circulation pump 260 is located at an elevation approximately 15 feet above the lowest elevation of reactor piping systems 110a/110b. However, use of the invention allows a pump that is located even 15 feet above the lowest elevation of systems 110a/110b to satisfactorily draw-down the contaminated solution, as disclosed more fully hereinbelow.

Referring yet again to FIG. 3, interposed between reagent supply source 210 and reactor piping systems 110a and 110b is flow control means, such as a flow controller 280 for transferring the reagent between systems 110a/110b in order to decontaminate systems 110a/110b without adding more reagent to systems 110a/110b. More specifically, flow controller 280 controls the flow of the contaminated solution and reagent selectively out of either system 110a or system 110b and then to resin bed 250 when required. Thereafter flow controller 280 controls the flow of contaminant-free reagent from resin bed 250 and selectively into either system 110a or system 110b. To perform this flow control function, flow controller 280 includes a valve arrangement, generally referred to as 290. Valve arrangement 290 comprises a first valve 300 disposed in conduit 230a for controlling the flow of liquid through conduit 230a as conduit 230a passes through flow controller 280. A second valve 310 is disposed in conduit 230b for controlling the flow of liquid through conduit 230b as conduit 230b passes through flow controller 280. Interconnecting conduit 230a and 230b is a first cross-over conduit 320 and disposed in first cross-over conduit 320 is a third valve 330 for controlling the flow of liquid through first cross-over conduit 320. First cross-over conduit 320 extends from the proximal side of second valve 310 to the distal side of first valve 300. Moreover, interconnecting conduit 230a and 230b is a second cross-over conduit 340 and disposed in second cross-over conduit 340 is a fourth valve 350 for controlling the flow of liquid through second cross-over conduit 340. Second cross-over conduit 340 extends from the distal side of second valve 310 to the proximal side of first valve 300. It is understood that the terminology "distal side" is defined herein to mean that side further away from reactor piping systems 110a and 110b (as illustrated in FIG. 3) and the terminology "proximal side" is defined herein to mean that side nearer to reactor piping systems 110a and 110b (as illustrated in FIG. 3). Thus, it will be understood that as pump 260 operates and as first valve 300 and second valve 310 are closed with valves 330 and 350 open, the corrosion-laden reagent flows from system 110b, through conduit 230b and first cross-over conduit 320, through pump 260 and into contact with resin bed 250. Thereafter, the contaminant-free reagent flows from resin bed 250, through second cross-over conduit 340, through conduit 230a and into system 110a. Similarly, it will be understood that as pump 260 operates and as third valve 330 and fourth valve 350 are closed with valves 300 and 310 open, the contaminated solution flows from system 110a, through conduit 230a through pump 260 and into contact with resin bed 250. Thereafter, the contaminant-free reagent flows from resin bed 250, through conduit 230b into system 110b. In this manner, flow controller 280 is capable of transferring reagent-containing solution out of system 110a and into system 110b and then out of system 110b and back into system 110a. Each time the contaminated solution is drawn out of either system 110a or system 110b, it passes into contact with resin bed 250 to remove the corrosion product 190 therefrom. Thus, systems 110a/110b are capable of being decontaminated by alternately repetitively "sluicing" or transferring the reagent solution between systems 110a/110b as often as desired to remove residual amounts of corrosion product 190 without adding reagent. Avoiding the addition of reagent reduces the volume of reagent and also avoids the purchase of additional reagent. Moreover, the opening and closing of valves 300/310/330/350, which may be electrically or air operated valves, may be automatically controlled, such as by a suitable computer device 360 electrically connected to valves 300/310/330/350.

Referring yet again co FIG. 3, pump 260 is typically located at an elevation above (e.g., approximately 15 feet) the lowest elevation of piping 110a/110b. Thus, it is important to pressurize systems 110a/110b to a predetermined pressure in order to maintain the head pressure in systems 110a/110b at a value greater than or equal to the rated NPSH of circulation pump 260 so that circulation pump 260 will transfer relatively more corrosion-laden reagent solution from systems 110a and 110b to resin bed 250 and thereafter return relatively more contaminant-free reagent back to systems 110a/110b. To achieve this purpose, apparatus 200 further comprises pressurizing means, generally referred to as 370, connected to systems 110a/110b for simultaneously pressurizing systems 110a/110b to a predetermined pressure (e.g., approximately ten pounds per square inch), in order to transfer corrosion-laden reagent solution from either system 110a or 110b to resin bed 250 and thereafter contaminant-free reagent back to systems 110a or 110b. Pressurizing means 370 comprises fluid injection means, such as a gas injector 380, for injection a gas (e.g., nitrogen) into systems 110a/110b. More specifically, a gas supply line 390 extends from gas injector 380 to a conduit 400. Conduit 400 is connected to a pair of conduits 410a/410b that in turn are respectively in communication with the interior of cross-over pipes 100a/100b, such as by means of being sealingly passed through the plugs 225 that are sealingly disposed in cross-over pipes 100a/100b. Disposed in gas supply line 390 may be valves 415a and 415b for controlling the flow of the gas through gas supply line 390. Moreover, disposed in conduit 400 on the out-board side of gas supply line 390 may be valves 420 and associated HEPA (Health and Environmental Protection Act) filters for safely venting gas from systems 110a and 110b prior to the decontamination, if required, and further for safely venting the gas from systems 110a/110b following the decontamination. It will be understood from the description hereinabove, that pressurized gas flows from gas injector 380, through gas supply line 390, into conduit 400 (when valves 415a and 415b are open), into conduit 410a/410b (when valves 420 are closed), into the interior of cross-over pipes 100a/100b, and thence into pipes 110a/110b to simultaneously pressurize systems 110a/110b to the predetermined gas overpressure. The pressure in systems 110a/110b will remain substantially constant as the height of the reagent solution in each system 110a/110b varies during the transfer of reagent between systems 110a/110b. That is, when reagent is transferred from system 110a to system 110b, by means of flow controller 280, the gas overpressure in system 110a will be maintained at its predetermined constant value because the pressurized gas will flow into system 110a to occupy the volume in system 110a left vacant by the reagent solution being transferred from system 110a to system 110b. Similarly, when reagent solution is transferred from system 110b to system 110a, by means of flow controller 280, the gas overpressure in system 110b will be maintained at its predetermined constant value because the pressurized gas will flow into system 110b to occupy the volume in system 110b left vacant by the reagent solution being transferred from system 110b to system 110a. In addition, conduits 410a/410b will not collapse because pressurizing conduits 410a/410b avoids a vacuum being formed in the conduits 410a/410b. When decontamination of systems 110a/110b is complete, valves 420 are opened to vent the nitrogen gas from systems 110a/110b.

Referring again to FIG. 3, apparatus 200 further comprises pressure monitoring means, such as first pressure transducers 430a/430b in communication with the interior of cross-over pipes 100a/100b, respectively, for monitoring the pressure of the gas in cross-over pipes 100a/100b. The pressure monitoring means also includes second pressure transducers 440a/440b connected to substantially the lowest elevation of systems 110a/110b, respectively, for monitoring the combined pressures of the gas and reagent in systems 110a/110b. In this manner, the operator of apparatus 200 can ascertain the gas pressure in systems 110a/110b by observing the outputs of transducers 430a/430b. In addition, by subtracting the outputs of transducers 430a/430b from the respective outputs of transducers 440a/440b, the operator of apparatus 200 can determine the level or elevation of reagent solution in systems 110a/110b. In this regard, the pressure of the gas is ascertainable from a reading of the outputs from transducers 430a/430b. The combined pressure of the gas and the reagent is ascertainable from a reading of the outputs from transducers 440a/440b. Subtracting the pressure of the gas from the combined pressure of the gas and reagent provides the pressure of reagent in systems 110a and system 110b. This pressure of the reagent can then be converted by the well-known Bernoulli fluid flow equation into an elevation head (e.g., in feet) of the reagent in pipes 120a/120b which belong to systems 110a/110b. The value of elevation head thus obtained for systems 110a/110b will be greater than or equal to the rated NPSH of pump 260 for transferring substantially all the reagent between systems 110a and 110b.

When decontamination of piping systems 110a/110b is complete, apparatus 200 is disconnected from piping systems 110a/110b in substantially the reverse order of its connection to piping systems 110a/110b.

It is understood from the description hereinabove that an advantage of the present invention is that use thereof reduces radiation fields surrounding the piping systems 110a and 110b so that radiation exposure to service personnel is reduced to a level as low as reasonable achievable thereby resulting in a reduced health hazard. This is so because radioactive corrosion products residing in piping systems 110a and 110b are removed by use of the invention before reactor system components are serviced.

Another advantage of the present invention is that use thereof results in lowered costs to service the reactor. This is so because reduction of radiation dose to individual service workers avoids the hiring and training of greater numbers of workers to service the reactor system.

Yet another advantage of the present invention is that use thereof removes more of the corrosion from the piping system compared to prior art techniques where system pressurization is not utilized. This is so because pressurizing the piping system maintains the NPSH of the piping system at an acceptable level.

Still another advantage of the present invention is that use thereof does away with the delay associated with off-loading the reactor core before the decontamination process begins. In this manner, decontamination activities are not on critical path during service operations.

A further advantage of the present invention is that the volume of reagent requiring disposal is reduced. This is so because the reagent is re-used as it is transferred from one part of the reactor piping system to another part of the reactor piping system.

Although the invention is illustrated and described herein in its preferred embodiments, it is not intended that the invention as illustrated and described be limited to the details shown, because various modifications may be obtained with respect to the invention without departing from the spirit of the invention or the scope of equivalents thereof. For example, although the invention is described for use in removing radio-active corrosion products from the recirculation piping systems of a nuclear reactor, the invention is also suitable for removing contaminants, whether or not radioactive, from any similar piping system, whether or not the piping system belongs to a nuclear reactor.

Therefore, what is provided is a method and apparatus for removing a corrosion product from a nuclear reactor piping system, which nuclear reactor piping system may be of a type commonly found in a BWR (Boiling Water Reactor).

What is claimed is:

1. In association with a multi-part nuclear reactor recirculation piping system having an interior wall having a corrosion product thereon, a method of removing the corrosion product from the interior wall, comprising the steps of:

(a) dissolving the corrosion product from the wall by supplying a reagent into the system, the corrosion product dissolving into the reagent to define a contaminated solution;

(b) absorbing the dissolved corrosion product from the contaminated solution to define a reagent-containing contaminant-free solution by contacting the contaminated solution with an ion exchange resin bed;

(c) pumping the contaminated solution from the system and into contact with the resin bed and thereafter pumping the contaminant-free solution from the resin bed and to the system by operating a circulation pump interconnecting the system and the resin bed, the circulation pump having a predetermined net positive suction head; and (d) pressurizing the system to between approximately 10 and 20 pounds per square inch gauge.

2. The method of claim 1, wherein said step of pressurizing the system comprises the step of injecting a pressurized gas into the system.

3. The method of claim 4, further comprising the step of sluicing the system by repetitively pumping the contaminant-free solution from one part of the system to another part of the system.

4. The method of claim 1, further comprising the step of heating the contaminant-free solution to a predetermined temperature by operating a heater in communication with the contaminant-free solution.

5. The method of claim 1, further comprising the step of monitoring the pressure in the system by operating a pressure transducer connected to the system.

6. In association with a nuclear reactor vessel having a first recirculation piping system and a second recirculation piping system attached thereto for recirculating a liquid through the vessel, the first system and the second system each having an interior wall having a radioactive corrosion product thereon; a method of removing the corrosion product from the interior walls of the first system and the second system, comprising the steps of:

(a) dissolving the corrosion product from the walls by supplying equal amounts of a reagent into the first system and the second system from a reagent supply source connected to the first system and the second system; the corrosion product dissolving into the reagent as the reagent reacts with the corrosion product to define a contaminated solution;

(b) absorbing the dissolved corrosion product from the contaminated solution to define a reagent-containing contaminant-free solution by contacting the contaminated solution with an ion exchange resin bed;

(c) pumping the contaminated solution from the first system and to the resin bed by operating a circulation pump interconnecting the first system and the resin bed and thereafter pumping the contaminant-free solution from the resin bed and to the second system, the circulation pump having a predetermined net positive suction head;

(d) pumping the contaminated solution from the second system and to the resin bed by operating the circulation pump and thereafter pumping the contaminant-free solution from the resin bed and to the first system; and (e) simultaneously pressurizing the first system and the second system to a predetermined pressure greater than or equal to the net positive suction head as the circulation pump operates.

7. The method of claim 6, wherein said step of simultaneously pressurizing the first system and the second system comprises the step of simultaneously injecting a pressurized gas into the first system and the second system by operating a gas injector connected to the first system and the second system.

8. The method of claim 6, wherein said step of simultaneously pressurizing the first system and the second system comprises the step of simultaneously pressurizing the first system and the second system to a pressure of between approximately ten and 20 pounds per square inch gauge.

9. The method of claim 6, further comprising the step of sluicing the first system and the second system with the contaminant-free reagent, by alternately repetitively transferring the reagent between the first system and the second system.

10. The method of claim 9, wherein said step of sluicing the first system and the second system comprises the steps of:

(a) operating a flow controller interconnecting the first system, the second system and the resin bed, the flow controller directing the contaminated solution from the first system and to the resin bed and thereafter directing contaminant-free reagent from the resin bed and to the second system;

(b) operating the flow controller interconnecting the first system, the second system and the resin bed, the flow controller directing the contaminated solution from the second system and to the resin bed and thereafter directing contaminant-free reagent from the resin bed and to the first system.

11. The method of claim 6, further comprising the step of heating the contaminant-free solution to a predetermined temperature by operating a heater in communication with the contaminant-free solution.

12. The method of claim 6, further comprising the step of monitoring the pressure in the first system and the second system by operating at least two pressure transducers connected to each of the first system and the second system.

13. In association with a nuclear reactor piping system having an interior wall having a corrosion product thereon, an apparatus for removing the corrosion product from the interior wall of the piping system, comprising:

(a) reagent supply means connected to the system for supplying a reagent into the system to dissolve the corrosion product from the wall and into the reagent, so as to define a contaminated solution;

(b) absorption means in contact with the contaminated solution for absorbing the dissolved corrosion product from the contaminated solution, so as to define a reagent-containing contaminant-free solution;

(c) circulation suction pump means interconnecting the system and said absorption means for pumping the contaminated solution from the system and into contact with said absorption means and thereafter pumping the contaminant-free solution from said absorption means and to the system, said circulation pump means having a predetermined net positive suction head; and (d) pressurizing means connected to the system for pressurizing the system to between 10 and 20 pounds per square inch gauge.

14. The apparatus of claim 13, wherein said absorption means is an ion exchange resin.

15. The apparatus of claim 13, wherein said pressurizing means comprises fluid injection means for injecting a pressurized fluid into the system to pressurize the system.

16. The apparatus of claim 15, wherein said fluid injection means comprises a gas injector for injecting a pressurized gas into the system to pressurize the system.

17. The apparatus of claim 13, further comprising heater means in communication with the contaminant-free solution for heating the contaminant-free solution to a predetermined temperature.

18. The apparatus of claim 13, further comprising pressure monitoring means connected to the system for monitoring the pressure in the system.

19. The apparatus of claim 18, wherein said pressure monitoring means comprises a pressure transducer.

20. In association with a nuclear reactor vessel having a first recirculation piping system and a second recirculation piping system attached thereto for recirculating a liquid through the vessel, the first system and the second system each having an interior wall having a radioactive corrosion product thereon, an apparatus for removing the corrosion product from interior walls of the first system and the second system, comprising:

(a) a reagent supply source connected to the first system and the second system for supplying a reagent into the first system and the second system to react with the corrosion product to dissolve the corrosion product from the walls and into the reagent, so as to define a contaminated solution;

(b) an ion exchange resin bed contacting the contaminated solution for absorbing the corrosion product from the contaminated solution to define a reagent-containing contaminant-free solution;

(c) a circulation pump interconnecting the first system and the second system with said resin bed for selectively pumping the contaminated solution from the first system and the second system and thereafter into contact with said resin bed, said circulation pump having a predetermined net positive suction head; and (d) a gas injector connected to the first system and the second system for simultaneously injecting a pressurized gas into the first system and the second system to pressurize the first system and the second system to a predetermined pressure greater than or equal to the net positive suction head, whereby the circulation pump selectively suctions the contaminated solution from one of the first system and the second system and thereafter to said resin bed and whereby said circulation pump selectively pumps the contaminant-free solution from said resin bed and to the first system and the second system.

21. The apparatus of claim 20, wherein said gas injector pressurizes the first system and the second system to a pressure of between approximately ten and 20 pounds per square inch gauge.

22. The apparatus of claim 20, further comprising a flow controller interconnecting the first system, the second system and said resin bed for transferring reagent between the first system and the second system, said flow controller adapted to direct the contaminated solution from the first system and to the resin bed and thereafter direct contaminant-free solution from the resin bed and to the second system, said flow controller being further adapted to direct contaminated solution from the second system and to said resin bed and thereafter direct contaminant-free reagent from said resin bed and to the first system, whereby the first system and the second system are decontaminated as the contaminant-free reagent is transferred between the first system and the second system.

\* \* \* \* \*